Figure 1:
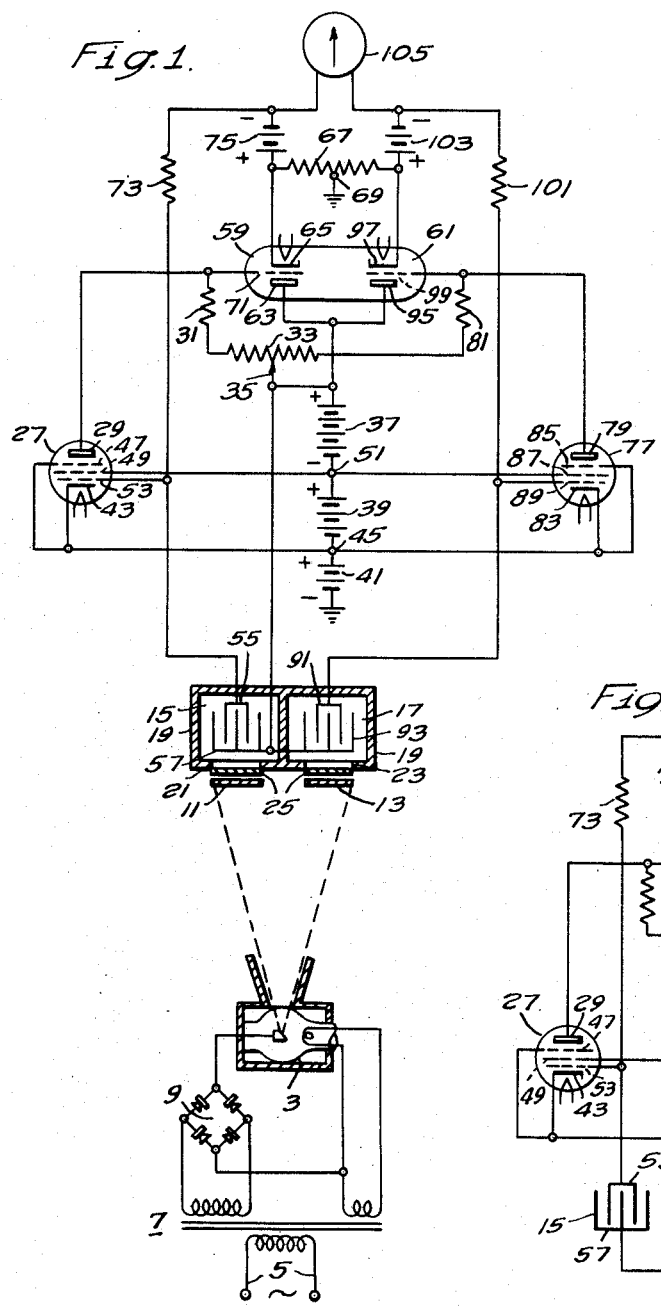

July 28, 1953 G. W. PENNEY ET AL 2,647,214
INSPECTING APPARATUS
Filed April 4, 1947

WITNESSES:
E. G. McCloskey.
John R. Shipman

INVENTORS
Gaylord W. Penney and
Harold A. Thomas.
BY
Hymen Diamond
ATTORNEY

Patented July 28, 1953

2,647,214

UNITED STATES PATENT OFFICE 2,647,214

INSPECTING APPARATUS

Gaylord W. Penney, Pittsburgh, Pa., and Harold A. Thomas, College Station, Tex., assignors to Westinghouse Electric Corporation, East Pittsburgh, Pa., a corporation of Pennsylvania Application April 4, 1947, Serial No. 739,516

4 Claims. (Cl. 250—83.6)

This invention relates to apparatus for inspecting or examining materials and, more particularly, to apparatus for examining materials by the X-ray absorption method. The invention has applicability to the measurement of the thickness of steel strip as it passes through a rolling mill.

Arrangements for examining materials by the X-ray absorption method make use of the well-known fact that the absorption of monochromatic X-rays by a homogeneous material varies with the thickness of the material. The amount of absorption by a material of a given thickness depends upon the particular material and the wave length of the X-rays.

In the past, differences in absorption of X-rays for examination purposes have been determined by the use of photographic film exposed to the X-rays after passage thereof through the material. Such an arrangement requires a considerable time to obtain the result desired, since a relatively long exposure must be made and the film processed and inspected.

A number of possible uses of the X-ray absorption method of examining material become impractical when a long time is required to obtain the results. For example, in connection with the rolling operations in a steel mill, it is desirable to measure the thickness of a substantially homogeneous steel strip without physical contact with the strip. The thickness of the strip may, of course, be measured by the X-ray absorption method. However, the strip is moving at a very high speed and an indication of the thickness is desired to permit correction and control of the rolling apparatus. To be useful, such an indication must, therefore, be obtainable very quickly and accurately.

In an attempt to avoid any undue time delay, more recent arrangements make use of a phototube exposed to light from a fluorescent screen subjected to the X-rays after passage thereof through the material to be examined. With this arrangement the time required for measuring the thickness is considerably reduced. However, considerable trouble has been experienced with such systems using commercially manufactured phototubes. The amount of light available from the fluorescent screen is relatively small and with variations in the sensitivity of the phototubes which are encountered, these systems are not entirely satisfactory.

It is accordingly an object of our invention to provide a new and improved apparatus for examining material by the X-ray absorption method.

Another object of our invention is to provide novel apparatus for measuring the thickness of a homogeneous material.

A further object of our invention is to provide novel apparatus for measuring the thickness of a homogeneous material in which an indication of the thickness relative to a standard is obtained quickly and accurately.

In accordance with our invention, X-rays after passage through the material to be examined, are received by an ionization chamber. The chamber may be of the multiplate type and the ion current produced therein is a measure of the X-ray absorption of the material. A special amplifier arrangement is used in conjunction with the ionization chamber to amplify the ion current and supply it to a current measuring device. The multiplate ionization chamber and special amplifier arrangement enable a quick response to ion current changes to be indicated on the measuring device.

Figure 2:
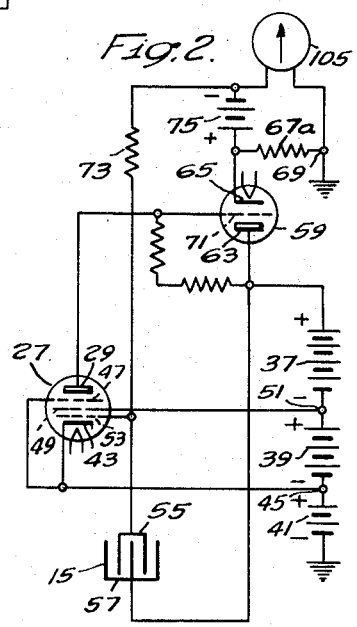

The features of our invention which are considered novel are set forth with more particularity in the accompanying claims. The invention itself, however, together with additional objects and advantages thereof, may be better understood from the following description of specific apparatus when read in connection with the accompanying drawing, in which:

Figure 1 is a schematic circuit diagram of a preferred embodiment of our invention employed as a thickness gage; and Fig. 2 is a schematic diagram of a modification of the apparatus of Fig. 1.

As shown in Fig. 1, a source of X-rays such as an X-ray tube 3 is provided and is energized from an alternating voltage source 5 through a transformer 7 and a full wave rectifier 9. X-rays from the X-ray tube 3 are projected toward a pair of metal strips 11 and 13. One of these strips 11 is considered as the test strip of unknown thickness and may be strip moving between rolls of a rolling mill. The other strip 13 is of the same material and is considered as the standard strip of known thickness. To avoid complicating the drawing, the apparatus for supporting the strips and the rolls are not indicated. The strip 11 will, however, often be at a high temperature.

The test strip 11 and the standard strip 13 are positioned side-by-side in a plane substantially perpendicular to the beam of X-rays from the X-ray tube 3. The tube 3 is preferably positioned with respect to the strips so that substantially the same quantity of X-rays is incident on each of the strips.

A pair of ionization chambers 15 and 17 are provided, one corresponding to each of the two strips 11 and 13. The chamber 15 corresponding to the test strip 11 is positioned on the opposite side thereof from the X-ray tube 3 and is arranged to receive X-rays from the tube after passage thereof through the test strip. Similarly, the chamber 17 corresponding to the standard strip 13 is positioned on the opposite side thereof from the X-ray tube 3 and receives X-rays after passage thereof through the standard strip. The ionization chambers 15 and 17 are enclosed in a case 19 of a material having a high X-ray absorption such as lead. A pair of openings 21 and 23 are provided in the case 19 to permit the entry of the X-rays. Over each of these openings is mounted a thin dust cover 25 of a material having a very low X-ray absorption such as aluminum. The covers for both chambers 15 and 17 are of the same material and thickness.

As X-rays from the X-ray tube 3 pass through the test strip 11 or the standard strip 13, some of the X-rays are absorbed in accordance with the thickness of the strip. Those X-rays which are not absorbed are received by the corresponding ionization chamber and produce ions therein so that the ion current in an ionization chamber is a measure of the thickness of the strip through which the corresponding X-rays pass. It is then necessary to amplify and measure the ion current of each chamber to obtain an indication of the thickness of the corresponding strip.

Ionization measurements in the past have been noted for the slow response obtainable. This slow response was due primarily to two factors, first, the time required to sweep out the ions and, second, the capacity of the collecting electrodes. In accordance with our invention, we propose to overcome the slow response in ionization measurement by employing a multiplate ionization chamber and a direct current amplifier having a negative feedback circuit between the output and input circuits of the amplifier causing the overall voltage amplification to be of the order of unity.

By using a multiplate ionization chamber, the distance which an ion must travel to reach a plate is reduced so that the ion transit time becomes negligible. In addition, the space charge effects are reduced in a multiplate ionization chamber so that charges resulting from ionization can reach the collecting surface quickly. However, the multiplate ionization chamber has a large capacity which tends to result in a slow response of the apparatus. The changes in ion current produced in the ionization chamber are rather small and, consequently, in an amplifier therefor, a large amplification and a coupling or input resistance of a high value are required. Such a large input resistance in conjunction with the large capacity of the chamber introduces a large time constant in the input circuit of the amplifier. The ion current produced in the ionization chamber flows through the high input resistance to produce a voltage thereacross resulting in a voltage change across the ionization chamber and the capacity of the chamber is so large that this change cannot take place rapidly.

In using the expression "multiplate ionization chamber" in the claim, I mean a chamber having the following attributes:

(1) A plurality of plates as distinct from two plates (one positive and one negative);

(2) Plates spaced so closely that the ion transit time between plates is negligible;

(3) Relatively low space charge effect;

(4) Relatively high capacity.

In accordance with our invention, a negative feedback circuit is provided between the output and input circuits of the direct current amplifier which, in effect, causes the output voltage to be in series with and in opposition to the voltage produced across the input resistance by the flow of ion current therethrough. By making the gain of the amplifier rather high, the output voltage may be made almost equal to that developed across the input resistance. As a result, the actual change in voltage across the ionization chamber can be made extremely small and is approximately 1/A of the amount of change which would be made without the use of the feedback circuit, where A is the gain of the direct current amplifier without the feedback. It is then apparent that with a high gain, the amount of voltage change across the ionization chamber is but an extremely small fraction of the change necessary with a conventional amplifier arrangement. Obviously, this extremely small change may take place quite rapidly so that the long time constant is eliminated.

With such an arrangement the voltage gain of the amplifier is of the order of unity. However, the current gain is approximately the ratio of the input resistance to the output resistance and may be of the order of twenty thousand to twenty million in a practical design.

For the arrangement shown in Figure 1, a direct current amplifier is provided which has two channels, one for the chamber 15 associated with the test strip 11 and one for the chamber 17 associated with the standard strip 13. The first or input tube 27 of the test channel is preferably a pentode having its anode 29 connected through a resistor 31 and a portion of a potentiometer 33 to the adjustable tap 35 thereon which is connected to the positive terminal of a direct current voltage source 37. The negative terminal of the voltage source 37 is connected to the positive terminal of a second direct current voltage source 39, the negative terminal of which, in turn, is connected to the positive terminal of a third direct current voltage source 41 having a connection from its negative terminal to the ground.

The cathode 43 of the input tube 27 is connected to the junction point 45 between the second and third voltage sources 39 and 41. The suppressor grid 47 of the input tube 27 is connected to the cathode 43 and the shield grid 49 is connected to the junction point 51 between the first and second voltage sources 37 and 39. The control grid 53 of the input tube 27 is connected to one set of plates 55 of the ionization chamber 15 while the other set of plates 57 is connected to the positive terminal of the first voltage source 37.

The input tube 27 is supplemented by a second amplifier tube 59 which is enclosed in the same envelope with a similar and corresponding tube 61 employed in the other channel. Additional amplifier tubes may, of course, be employed as desired, but the total number of tubes in the channel should be an even number.

The anode 63 of the second amplifier tube 59 is connected to the positive terminal of the first voltage source 37. The cathode 65 of the second amplifier tube is connected through a portion of a resistor 67 to the grounded intermediate tap 69 thereon. The control electrode 71 of the second amplifier tube 59 is connected to the anode 29 of the input tube 27.

The control electrode 53 of the input tube 27 is also connected to the cathode 65 of the second amplifier tube 59 through an input resistor 73, having a high resistance, and a first biasing voltage source 75. It will be evident to those skilled in the art that this connection provides a negative feedback. By this arrangement, the voltage developed across the input resistor 73 by the flow of ion current therethrough is opposed by the output voltage of the amplifier channel. Thus the actual change in voltage across the ionization chamber is the difference between these two voltages and is extremely small.

The second amplifier channel for the ionization chamber 17 is similar to that for the chamber 15 and includes an input tube 77 and the second amplifier tube 61. The anode 79 of the input tube 77 of the second channel is connected through a resistor 81 and a portion of the potentiometer 33 to the adjustable tap 35 thereon, which is connected to the positive terminal of the first voltage source 37. The cathode 83 of the input tube 77 is connected to the junction point 45 between second and third voltage sources 39 and 41 and the suppressor grid 85 is connected to the cathode 83. The shield grid 87 of the input tube 77 is connected to the junction point 51 between the first and second voltage sources 37 and 39. The control grid 89 of the input tube 77 is connected to one set of plates 91 of the ionization chamber 17 while the other set of plates 93 is connected to the positive terminal of the first voltage source 37.

The anode 95 of the second amplifier tube 61 of the standard channel is connected to the positive terminal of the first voltage source 37 while the cathode 97 is connected through a portion of the resistor 67 to the grounded intermediate tap 69 thereon. The control grid 99 of the second amplifier tube 61 is connected to the anode 79 of the input tube 77 of the second channel.

It is to be noted that the cathodes of all four tubes 27, 59, 61 and 77 of the amplifier are indirectly heated but the heating circuits are omitted from the drawing for purposes of clarity.

The control electrode 89 of the input tube 77 is connected through an input resistor 101, having a high resistance, and a second biasing voltage source 103 to the cathode 97 of the second amplifying tube 61. Thus a negative feedback circuit is also provided for the second channel. It is also evident that the ion currents in both ionization chambers are amplified by substantially identical channels of the direct current amplifier.

A current measuring device 105 is connected between the negative terminals of the first and second biasing voltage sources 75 and 103. Consequently, this device 105 indicates the difference in the ion currents of the two ionization chambers as well as which of the currents is the larger and thus indicates whether the test strip is thicker or thinner than the standard strip and the amount of the difference.

To give a specific example of an arrangement in accordance with the showing of Fig. 1, the input tubes 27 and 77 of both channels of the amplifier may be RCA-6SJ7 tubes, and the twin tube employed as the second amplifier tubes 59 and 61 in both channels may be an RCA-6SN7 tube. The resistors described may have the following values:

| Resistor No. | Megohms |
| --- | --- |
| 31 | .5 |
| 33 approximately | .5 on each side of tap 35 |
| 67 | 20 on each side of tap 69 |
| 73 | 20 |
| 81 | .5 |
| 101 | 20 |

The voltage sources may have the following values:

| Voltage Source No. | Volt |
| --- | --- |
| 37 | 62.5 |
| 39 | 22.5 |
| 41 | 1.5 |
| 75 | 45.0 |
| 103 | 45.0 |

The ionization chambers were of the multiplate type having a maximum capacitance of the order of .01 microfarad and the measuring device was a 0-50 microamp meter.

Although we have illustrated the X-ray tube as positioned so that substantially the same quantity of X-rays is projected on to each strip, it may be positioned otherwise. The object, of course, is to acquire a balance with the meter at a zero reading when the two strips are of the same thickness. By having a single X-ray tube supply of X-rays for both strips, any variation in X-ray intensity because of variations in source voltage is balanced out.

In the arrangement shown in Fig. 1, two ionization chambers 15 and 17 are employed, one of which acts as a monitor to indicate the absorption of X-rays by the strip 13 of standard thickness which is compared with that of test strip 11. Such an arrangement minimizes any effects of fluctuations in the X-ray output of the X-ray tube 3 such as may be caused by X-ray tube supply voltage changes. However, in the event such monitoring action is not necessary, an arrangement may be employed in which but a single ionization chamber is used to measure the X-ray absorption by the material to be examined or tested. Such an arrangement may employ a circuit as shown in Fig. 2.

The circuit of Fig. 2 corresponds to a single channel of the amplifier of Fig. 1 and the same reference numbers are applied to corresponding elements. It is apparent that the only departure of the circuit of Fig. 2 from that of a single channel of the circuit of Fig. 1 is in the connection of the current measuring device 105 which is necessarily placed directly across the output resistor 67a.

In this arrangement, the current measuring device is calibrated to read the absorption directly. Thus, any change in the reading of the measuring device 105 would indicate a change in the absorption of X-rays by the strip being tested.

Although we have shown and described specific embodiments of our invention as applied to measuring the thickness of a material, we are aware that many other applications of our invention as well as other embodiments may be made by those skilled in the art without departing from the spirit of the invention. We do not intend, therefore, to have to limit our invention to the particular embodiment or arrangement shown and described herein.

We claim as our invention:

1. Apparatus for examining an object comprising means on one side of said object for projecting a beam of X-rays toward said object, an ionization chamber on the other side of said object for receiving X-rays of said beam after passage thereof through said object whereby an ion current is produced in said chamber, a direct current amplifier connected to said chamber to amplify said ion current, a negative feedback circuit between the output and input circuits of said amplifier including components having dimensions causing the overall voltage amplification to be of the order of unity, and a current measuring device in said output circuit.

2. Apparatus for examining an article comprising means on one side of said article for projecting a beam of X-rays toward said article, a multiplate ionization chamber on the other side of said article for receiving X-rays of said beam after passage thereof through said article whereby an ion current is produced in said chamber, a direct current amplifier coupled to said chamber with an input resistor through which said ion current flows, circuit means connecting said input resistor to the output circuit of said amplifier causing the input resistor voltage produced by said ion current to be opposed by the output voltage of said amplifier, said circuit means including components dimensioned so that the gain of said amplifier causing said output voltage to equal substantially said input resistor voltage, and a current measuring device in said output circuit.

3. Apparatus for comparing two articles, comprising a source of X-rays adapted to project X-rays on each of said articles, an ionization chamber associated with each of said articles for receiving X-rays from said source after passage thereof through the corresponding article, whereby an ion current is produced in each chamber, a direct current amplifier having two amplification channels corresponding to said chambers, each channel being connected to the corresponding chamber to amplify the ion current thereof, a negative feedback circuit between the output and input circuits of each channel having components having dimensions causing the overall voltage amplification of each channel to be of the order of unity, and a current measuring device connected in the output circuit of both channels to indicate the difference between the output voltages thereof.

4. Apparatus for comparing two articles, comprising a source of X-rays adapted to project X-rays on each of said articles, a multiplate ionization chamber associated with each of said articles for receiving X-rays from said source after passage thereof through the corresponding article, whereby an ion current is produced in each chamber, a direct current amplifier having two amplification channels corresponding to said chambers, each channel being coupled to the corresponding chamber with an input resistor through which the ion current of that chamber flows, circuit means connecting the input resistor to the output circuit of each channel causing the input resistor voltage produced by the corresponding ion current to be opposed by the corresponding output voltage, said circuit means having components such that the gain of each channel causing the output voltage thereof to equal substantially the corresponding input resistor voltage, and a current measuring device connected in the output circuit of both channels to indicate the difference between the output voltages thereof.

GAYLORD W. PENNEY.
HAROLD A. THOMAS.

References Cited in the file of this patent

UNITED STATES PATENTS

| Number | Name | Date |
| --- | --- | --- |
| 2,094,318 | Failla | Sept. 28, 1937 |
| 2,097,760 | Failla | Nov. 2, 1937 |
| 2,264,725 | Shoupp et al. | Dec. 2, 1941 |
| 2,346,486 | Hare | Apr. 11, 1944 |
| 2,349,429 | Herzog et al. | May 23, 1944 |
| 2,365,763 | Kalb et al. | Dec. 26, 1944 |
| 2,458,099 | Roop | Jan. 4, 1949 |
| 2,465,938 | Shonka | Mar. 29, 1949 |
| 2,536,617 | Weller | Jan. 2, 1951 |
| 2,537,914 | Roop | Jan. 9, 1951 |

FOREIGN PATENTS

| Number | Country | Date |
| --- | --- | --- |
| 293,240 | Germany | July 27, 1916 |
| 554,001 | France | Feb. 21, 1923 |
| 567,280 | Great Britain | Feb. 6, 1945 |
| 601,545 | France | Dec. 1, 1925 |

OTHER REFERENCES

Terman, Radio Engineers Handbook, McGraw-Hill Book Co., 1943, pp. 395–397 and 402. (Copy in Div. 54.)